(12) United States Patent
Anderson et al.

(10) Patent No.: US 9,860,223 B2
(45) Date of Patent: Jan. 2, 2018

(54) MAPPING THE NETWORK FILE SYSTEM (NFS) PROTOCOL TO SECURE WEB-BASED APPLICATIONS

(71) Applicant: International Business Machines Corporation, Armonk, NY (US)

(72) Inventors: Sheehan Anderson, Morrisville, NC (US); Richard Lee Kulp, Cary, NC (US); Gili Mendel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 13/851,235

(22) Filed: Mar. 27, 2013

(65) Prior Publication Data

US 2014/0298413 A1    Oct. 2, 2014

(51) Int. Cl.
*H04L 29/06* (2006.01)
*G06F 17/30* (2006.01)
*H04L 29/08* (2006.01)

(52) U.S. Cl.
CPC ........ *H04L 63/08* (2013.01); *G06F 17/30203* (2013.01); *H04L 63/0807* (2013.01); *H04L 63/10* (2013.01); *H04L 67/02* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 6,212,640 B1 * | 4/2001 | Abdelnur et al. | 726/2 |
| 6,341,352 B1 | 1/2002 | Child et al. | |
| 6,678,828 B1 * | 1/2004 | Zhang et al. | 726/2 |
| 6,813,641 B2 * | 11/2004 | Fomenko et al. | 709/230 |
| 7,660,902 B2 * | 2/2010 | Graham et al. | 709/229 |
| 8,112,629 B2 * | 2/2012 | Schneider | 713/170 |
| 8,161,520 B1 | 4/2012 | Brunette et al. | |
| 2004/0221179 A1 | 11/2004 | Seshadri | |

(Continued)

OTHER PUBLICATIONS

Carasik, "Choosing the Best Solution for Your Network Security: Secure Shell, TLS or IPSec," 2001.

(Continued)

*Primary Examiner* — Benjamin Lanier
(74) *Attorney, Agent, or Firm* — Christopher K. McLane; Jeffrey S. LaBaw; David H. Judson

(57) ABSTRACT

Users on a client system access files served by a web application through the Network File System (NFS) protocol using common web authentication mechanisms while still honoring constraints imposed by the application's authorization rules. To this end, the client system is modified to include an NFS server. Following authentication of the NFS server with the web application, NFS-based requests (from a local NFS client) directed to the application are received at the NFS server instead of being sent to the application directly. The NFS server, in turn, maps those requests to the web application preferably using standard HTTP. Because the web application's normal security model is enforced as intended at the web application, the approach enables individual users of the client system to operate under different visibility constraints dictated by the web application. Thus, fine-grained permissions may be enforced at the web application for different users.

21 Claims, 4 Drawing Sheets

(56) References Cited

U.S. PATENT DOCUMENTS

2005/0278529 A1* 12/2005 Kano ........................... 713/168
2007/0260717 A1* 11/2007 Kano ........................... 709/223
2014/0040993 A1*  2/2014 Lorenzo et al. ................. 726/4

OTHER PUBLICATIONS

Gustafson, et al, "Securely Available Credentials (SACRED)—Credential Server Framework (RFC3760)," IPCOM000027940D, Apr. 2004.
IBM, "How to Secure the Internet Connection Server for MVS/ESA," IBM Redbooks, Jun. 1996.

* cited by examiner

MAPPING THE NETWORK FILE SYSTEM (NFS) PROTOCOL TO SECURE WEB-BASED APPLICATIONS

BACKGROUND OF THE INVENTION

Technical Field

This disclosure relates generally to enabling users on a client system to access files over a network using network protocols.

Background of the Related Art

Network File System (NFS) is a standards-based distributed file system protocol that allows a user on a client computer to access files over a network in a manner similar to how local storage is accessed. In particular, it is a mechanism that allows users to access files and directories located on remote computers and to treat those files and directories as if they were local. For example, users can use operating system or other commands to create, remove, read, write, and set file attributes for remote files and directories. An NFS software package typically includes commands and daemons for NFS and other services. NFS provides its services through a client-server relationship.

Many web applications (e.g., web servers, wikis, software libraries, and the like) serve files. Web-based file access also typically is client-server based. Typically, the client-server interaction involves HTTP, HTTPS or other transport such as Simple Object Access Protocol (SOAP) over HTTP, FTP, REST, or others. Often, it is desired to "secure" files or other resources that may be accessible over the Web. Where secure web-based access is required, a web portal or the like may be implemented to provide authorization and access control services for web resources. In a typical enterprise-based operating environment, a high performance, multi-threaded web server manages access to one or more web servers and provides authentication and authorization services. This allows the enterprise to centrally control their web resources as a single, logical web space.

It would be useful for client computers to be able to access web-based files through the NFS protocol. This would provide a "local" file access to the remote files that are otherwise accessible, e.g., via a web portal or the like. A problem, however, is that web applications accessible through the portal typically use web-based authentication mechanisms (e.g., OAuth, Basic Authentication, form-based authentication, digest-based authentication, among others) to drive file access authorization; NFS, in contrast, typically provides authorization (and, in particular, permissions) based on an Internet Protocol (IP) address of the client system that accesses the NFS server, together with an identifier (ID) of the user accessing the file on the client system. The ID usually is the user's identity on the client machine. These authorization mechanisms, however, are incompatible with one another. In particular, the client machines (from which NFS-based access would be desired) are often located in private IP address domains or behind network firewalls. As such, typically the IP addresses of those machines cannot propagate over the wide area network (required for web-based remote access). Moreover, often the client machines are used by multiple users each of whom may work on the machine under different authorization constraints. A further complication is that NFS implementations do not provide adequate support to enable system-based authentication across a wide area network.

There remains a need to provide a mechanism that will allow users on a client system to access files secured by a web application using NFS and in a manner that is consistent with the application's authorization rules.

BRIEF SUMMARY

According to this disclosure, users on a client system access files served by a web application through the Network File System (NFS) protocol using common web authentication mechanisms while still honoring constraints imposed by the web application's authorization rules. To this end, the client system (which normally includes an NFS client) is modified to include NFS server (or server-like) functionality such that an NFS client-server interaction may be implemented entirely within the client system. This client-side functionality is sometimes referred to herein as "a delegated (or "delegate") NFS server" that is implemented on the client system. The delegate NFS server first authenticates with the web application. Thereafter, NFS-based requests (from the local NFS client) that are directed to a secure web application are then received at the delegated NFS server executing on the client system instead of being sent to the secure web application directly. The delegate NFS server, in turn, maps those requests to the web application, preferably using standard HTTP. Because HTTP (or HTTPS) is used as the transport between the delegate NFS server and the web application, common web authentication mechanisms (such as OAuth, basic, form-based, digest-based, and the like) that the web application already implements can be leveraged. In addition, any web application authorization mechanism operates (on the in-bound requests) in its usual manner.

Under this approach, a user of the client system securely accesses web-based files using NFS while being constrained by the web application's authorization rules. Because the web application's normal security model is enforced as intended at the web application, the approach also enables individual users of the client system to operate under different visibility constraints dictated by the web application. Thus, fine-grained permissions may be enforced at the web application for different users.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
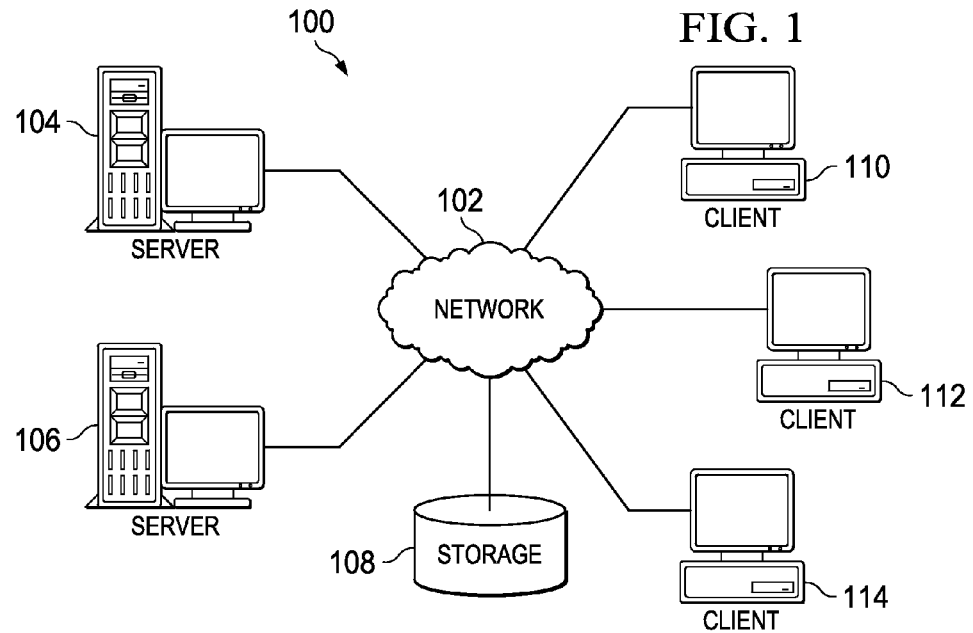
FIG. 1 depicts an exemplary block diagram of a distributed data processing environment in which exemplary aspects of the illustrative embodiments may be implemented.
Figure 2:
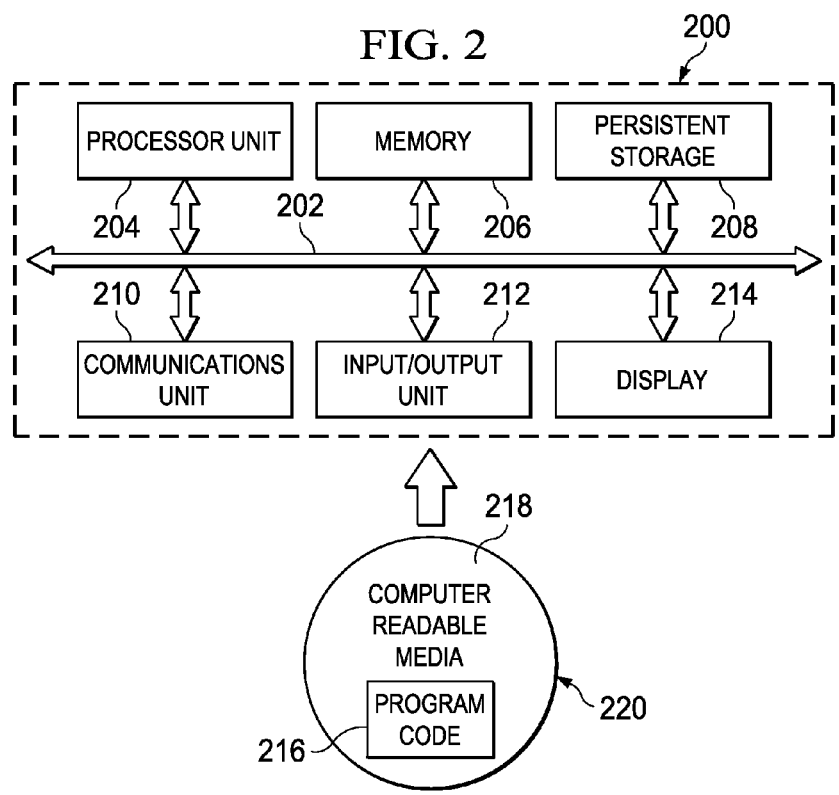
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Network Model With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, Objective-C, C++ or the like, and conventional procedural programming languages, such as the "C" programming language or similar programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Secure Web-Based Access

It is known in the prior art to provide so-called Web portals, which are web-based mechanisms that centralize access to information, applications, and services for employees, customers, or partners. A Web portal delivers a consolidated view that lets users access electronic resources of the organization using a standard technology (a web browser), simply and efficiently. Within a Web portal or like environment, typically a proxy or web server acts as a front-end "point of contact" to a set of back-end applications or application components. In this type of environment, it is desirable that the mechanism used to provide authentication and session management at the web portal layer should also provide these functions for any back-end applications that are included in a consolidated view.

Figure 3:
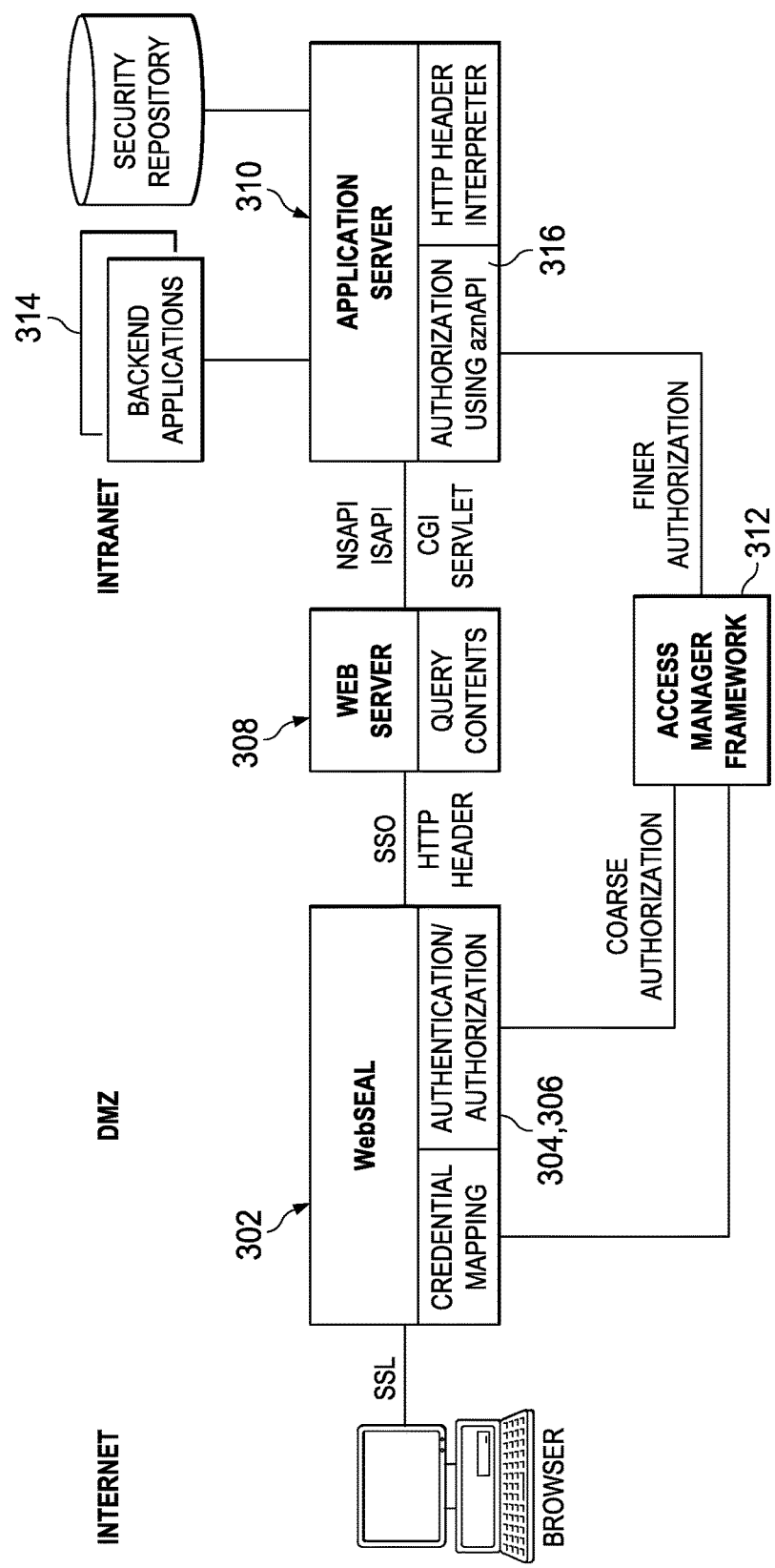
FIG. 3 illustrates a known web portal having an access management framework in which the subject disclosure may be implemented.

A typical web portal is shown in FIG. 3. A system of this type typically provides session management in association with access control. Thus, the system includes a session management component, together with an access manager, which is a component that prevents unauthorized use of resources, including the prevention of use of a given resource in an unauthorized manner. A representative access manager is the Tivoli® Access Manager for e-business (TAMeb) product, which is available commercially from IBM, and is represented in FIG. 3. Of course, the identification of this commercial product is not meant to be taken to limit the disclosed subject, as the NFS mapping approach may be used in association with any web application (or secure web application). As used herein, a web application may comprise a web site (a collection of web pages), a web-based front-end to a back-end application, or the like.

More broadly, any system, device, program or process that provides session management and/or web-based access control may be the subject of the described approach. In general, these types of functions/services may be implemented in an intermediary between a client browser and one or more back end applications.

FIG. 3 illustrates how TAM is integrated in a Web portal to provide authorization and access control services for Web resources. A high performance, multi-threaded Web server 302 (called WebSEAL in the figure), a TAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

As one of ordinary skill in the art will appreciate, TAM provides a reverse proxy, web plug-in or the like that provides session management functionality and that includes authorization functionality as part of this session management. Authentication is handled by TAM, meaning that TAM collects a user's authentication credentials, evaluates them, and establishes a session, including some form of session management functionality (such as a session cookie). To provide a user with the advantages of this consolidated environment, TAM then provides a single sign-on solution for the user by asserting authentication credentials (such as username/password) to the back-end applications. This allows the back-end application to be added to the portal environment without modification.

Web-Based Authentication

By way of additional background, authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

With the increasing use of distributed web services and cloud computing, third-party applications often require access to these server-hosted resources. OAuth is an open protocol (Internet Request for Comment (RFC) 5849) that enables users to share their private data among different Web sites along with their credentials while only exposing the data on the original Web site where it is held. In particular, the OAuth protocol allows users to share private resources stored on one Web site with other sites without exposing the users' credentials—for example, usernames and passwords—to Web sites other than the one holding the users' data. A Web site adopting OAuth as one of its authentication protocols enhances the privacy and security for users. To accomplish this functionality, OAuth introduces to the traditional client-server authentication model a third role, a resource owner. In the OAuth model, the client (which is not the resource owner, but is acting on its behalf) requests access to resources controlled by the resource owner but hosted by the server. In addition, OAuth allows the server to verify not only the resource owner authorization, but also the identity of the client making the request.

Other common authentication mechanisms for use with web applications include form-based authentication, basic access authentication, digest-based access authentication, and others.

As used herein, a "context" is a client-server operating state with respect to a particular user agent application, on the one hand, and a designated application, on the other hand, following authentication of the client to the server.

Network File System (NFS) Protocol

As noted above, the Network File System (NFS) is a mechanism for storing files on a network. It is a distributed file system that allows users to access files and directories located on remote computers and to treat those files and directories as if they were local. For example, users can use operating system commands to create, remove, read, write, and set file attributes for remote files and directories. An NFS software package typically includes commands and daemons for NFS, Network Information Service (NIS), and other services. Although NFS and NIS are installed together as one package, each is independent and each is configured and administered individually. A representative commercial implementation of this type is IBM AIX® Version 7.1 Network Information Services (NIS and NIS+). AIX 5.3 and later supports the NFS version 2, 3, and 4 protocols. NFS version 4 is the most recently-defined version of NFS, and it is described by RFC 3530. As is well-known, NFS clients use the NFS version 3 protocol by default. NFS provides its services through a client-server relationship. NFS mapped file support allows programs on a client to access a file as though it were in memory. AIX also supports Network File System (NFS) proxy serving. An AIX server can concurrently export locally accessible file systems and proxy exports. The exported proxy view can be mounted by NFS clients. There are three types of NFS mounts: predefined, explicit, and automatic.

Mapping the NFS Protocol to Secure Web-Based Applications

Figure 4:
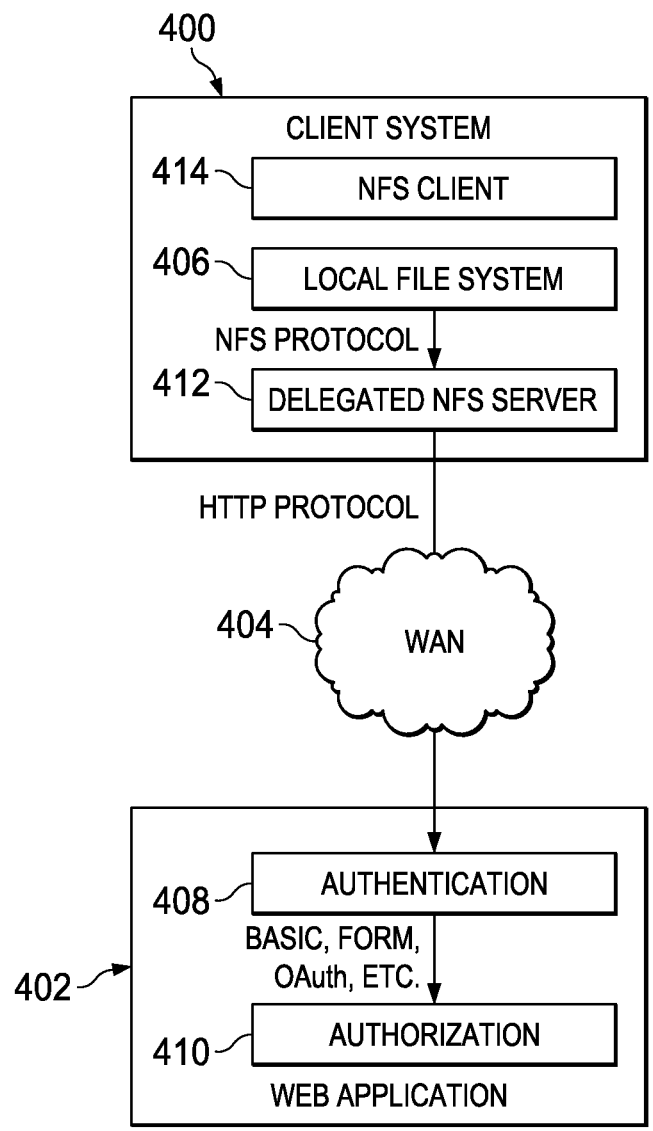
FIG. 4 is a simplified block diagram of the techniques of this disclosure whereby a local client system is augmented to include a delegated NFS server.

With the above as background, the techniques of this disclosure are now described. As seen in FIG. 4, the disclosure assumes the existence of a client system 400 that interacts with a web application 402 over a network (e.g., a wide area network (WAN)) 404. The client system 400 has a local file system 406 that is NFS-compliant. The web application 402 typically is a web portal of the type described that includes an authentication mechanism 408, and an authorization mechanism 410. Transport is provided over conventional web-based access, such as HTTP, HTTPS, SOAP over HTTP, REST, or the like. While the network 404 is shown as being a WAN (e.g., the publicly-routable Internet), this is not a limitation, as the network may be any wireline or wireless network, a private network, or some combination of any of the above types. The web application 402 may be located within or otherwise associated with a cloud service.

According to this disclosure, the client system 400 is augmented to include a special NFS-compliant server 412, which is sometimes referred to herein as a "delegate NFS server." An NFS server that has been configured in this manner is sometimes referred to herein as being "instantiated" in the client system. The NFS server may be implemented as an adjunct (e.g., an add-on, a plug-in, or the like) to existing code, integrated with other code, or even accessed remotely. More generally, the delegate NFS server 412 is implemented as a program or process (and associated data structures), typically as a software code executed by a hardware processor. The delegate NFS server 412 provides "server-side" handling (albeit on the client system) of NFS requests issued by one or more NFS clients 414 associated with the client system 400. Thus, NFS server 412 typically comprises a number of sub-components, such as an NFS daemon (e.g., nfsd), which services requests from the NFS clients, an NFS mount daemon (e.g., mountd), which carries out the requests that the NFS deamon passes to it, and a daemon (e.g., rpcbind) that allows NFS clients to discover which port the NFS server is using. The NFS mount daemon runs automatically whenever the NFS server is enabled on the client system. The NFS clients 414 may be one of many different clients (e.g., UNIX-based, Windows-based, or the like), and a particular NFS client 414 may also have a daemon (e.g., nfsiod) to service any requests from the NFS server. Without limitation, and in one representative embodiment, the delegate NFS server 412 is configured to run on a loopback network interface (localhost) or other appropriate interface of the client system so that the server 412 receives one or more NFS-based requests (e.g., mount, file access, and the like) that would otherwise be intended to traverse the network to the remote system.

According to this approach, the delegate NFS server 412 first authenticates with the web application. Then, by virtue of executing in the client system, the delegate NFS server 412 intercepts one or more NFS requests from the NFS clients and maps them to the web application using a web-based access protocol (namely, HTTP, HTTPS, etc.) that otherwise supports one or more common web authentication mechanisms. By mapping the NFS requests in this manner, the delegate NFS server enables NFS client requests to the web application but still maintains the semantics of the web application and its authorization rules. The technique avoids having to authenticate the NFS request using either the local client IP address and/or the local user's identifying information (e.g., local identity) on that machine. The approach enables NFS clients to operate under the visibility constraints dictated by the web application. In addition, by enabling the web application to operate in its usual manner, more fine-grained permissions (that would otherwise be enforced by the web-based authentication mechanism) may be implemented with the context of the NFS request. Thus, for example, with the web application "User A" may be able to see a particular file while "User B" is not. This permission-based access control uses the standard web application's authorization rules and without requiring NFS-based controls that would otherwise be necessary to provide such fine-level control.

Preferably, the delegate NFS server operates under one of several operating modes. In a first operating mode, when the delegate NFS server is started on the client local system the server goes through an authentication process prompting the user for credentials (or, in the alternative, reading the user's credentials from a protected file, such as a user registry). The delegate NFS server then authenticates with the remote web application using a common web-based authentication mechanism, such as OAuth, basic authentication, digest authentication, form-based authentication, or the like, depending on the security model under which the web application is working. Once the delegate NFS server instance is authenticated to the web application, NFS requests (e.g., mount, file access, and the like) are made under a context of the configured user. This mode of operation is sometimes referred to as "single user access context" operating mode.

In a second operating mode, the delegate NFS server first establishes a trust relationship with the web application. In this mode, when the delegate NFS server is started on the client local system, it authenticates with the remote web application (once again, using a web-based authentication mechanism), and in response receives a token that is specific to the delegated NFS server. The token (or, more generally, a unique data string) may be provided to the delegate NFS server using a private certificate, or other means. The token serves as an indication of trust from the web application that users that are authenticated with the client system (wherein the NFS server is running) were authenticated (to the web application) properly; as such, the token further provides trust that the users can be mapped reliably to identities that the web application recognizes. Then, any user access to the delegate NFS file system is mapped with a context for the user performing the file access. In this second operating mode, sometimes referred to herein as "user-specific authorization"), the delegated NFS server is only able to serve content (from the web application) that is authorized for the user that is accessing the file system.

In the second mode, the delegate NFS server in effect can authenticate as a "super" user that is able to act on behalf of other users. In one example scenario, assume that the delegate NFS server has the ability to issue one or more commands, such as: "download file X if 'user a' has permission," "Show the files that 'user b' is able to view," "Upload file Y if 'user c' has permission," and so forth. In this mode, the delegate NFS server does not have to provide authentication for each of these users. The web application trusts the NFS server (as all users) because of the "super" user authentication. This authentication may take place through any authentication mechanism that the web application supports. The actual users are authenticated by the delegate NFS server, typically using a registry external to the web application (e.g., LDAP).

In either operating mode, the users on the client system can access files using NFS while being constrained by the web application's authorization rules.

Preferably, the delegate NFS server communicates with the web application over a communication channel that is secured via transport layer security such as SSL, TLS, or the like. As noted above, in the second operating mode, the trust relationship is established between an authentication component (in the delegate NFS server) and a security component associated with the web application. Typically, a trust relationship of this type is created using conventional cryptographic mechanisms, such as the secure exchange of a secret cryptographic data signature key that is used to validate client-end-user identities and other information. The actual secure exchange may be accomplished by multiple known methods.

Figure 5:
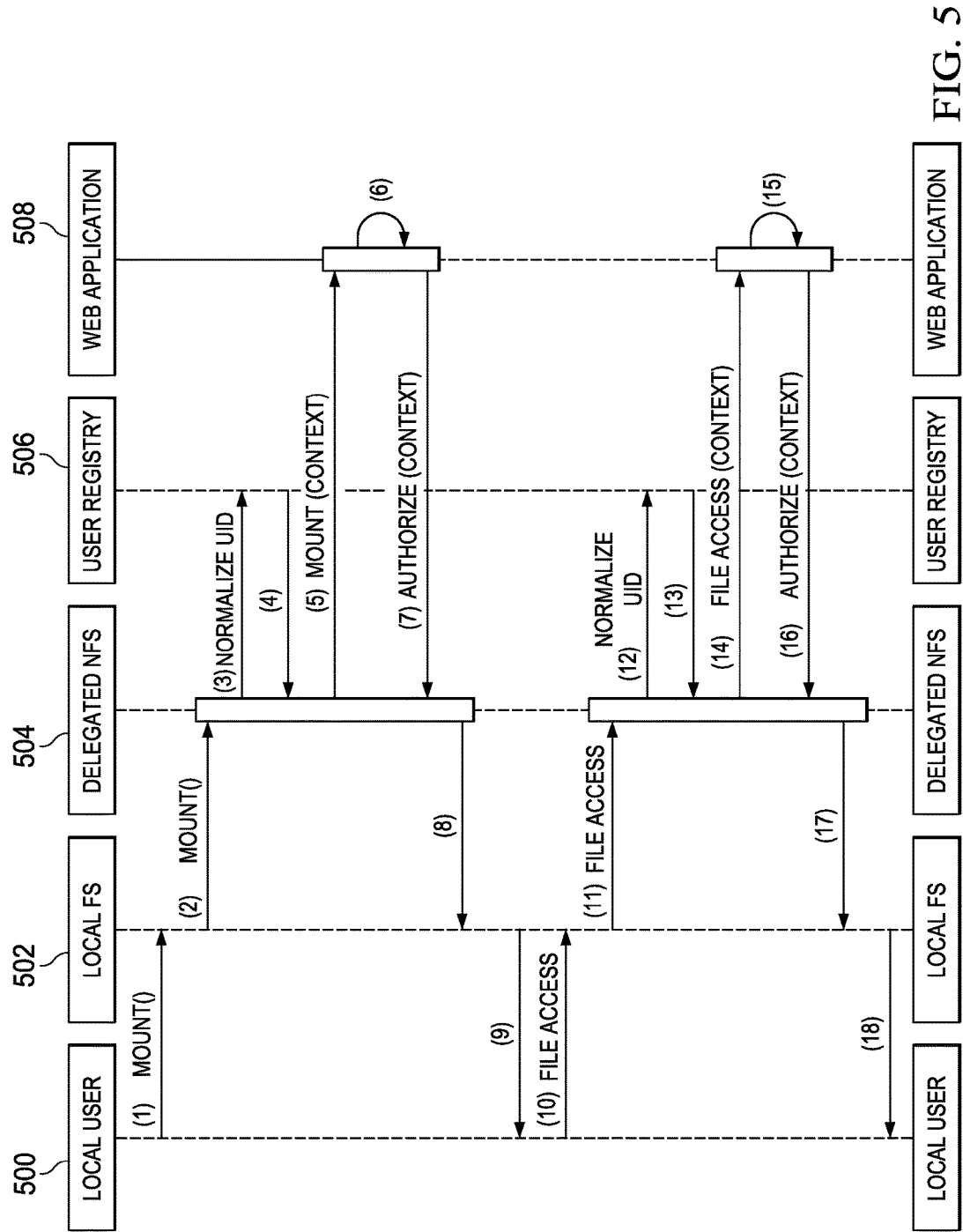
FIG. 5 illustrates how the delegated NFS server is used to allow a client to execute NFS commands transparently to the secure web application according to this disclosure.

FIG. 5 illustrates a representative NFS server message flow for two (2) distinct NFS messages, an NFS mount, and an NFS file access. Familiarity with basic NFS commands and conventions is assumed. In this operating scenario there is a local user 500, the client system local file system 502, the delegate NFS server 504 as has been described, a user registry 506, and the web application 508. Typically, the user registry 506 is associated with the client system, but it may also be located in association with the web application 508. The user registry (also referred to as a local user registry or security registry) contains information, such as user IDs and passwords, on users having access rights with respect to one or more resources. The NFS mount begins when the local user 500 (through the NFS client) issues the mount. At step (1), the mount ( ) is received by the local file system 502. At step (2), the mount ( ) is output from the local file system 502 and received by the delegate NFS server 504, which as noted above has been positioned (at the local client system) between the NFS client and the remote web application. At step (3), the delegate NFS server 504 issues a request to the user registry 506 to normalize a user identity associated with the local user. At step (4), the response from the user registry is received and processed by the delegated NFS server 504. During this step, the delegate NFS server 504 associates (to the original NFS request) "context" information associated with the local user 500. Thus, the mount is made under a context of the configured local user. At step (5), the NFS mount ( ) which is now augmented to include (or, more generally, have associated therewith) information defining a context of the local user 500, is then sent (for authentication and authorization) to the web application 508. As noted above, preferably step (5) occurs via secure transport. At step (6), the web application performs authentication and authorization. The type of authentication used depends on the security model under which the web application is operating. Web application authorization is carried out using local mechanisms including the application's local authorization rules, which may be permission-based. In this manner, the NFS request is processed by the web application (authenticate) but is still constrained by the web application's authorization rules. If the request is validated through the authentication and authorization mechanisms, a response is returned to the delegated NFS server at step (7). This response is forwarded on to the local file system at step (8) and, thereafter at step (9), to the NFS client associated with the local user. This completes the processing of the mount request.

The NFS file access request is processed in a similar manner. The NFS file access begins when the local user 500 (through the NFS client) issues the file access. At step (10), the file access ( ) is received by the local file system 502. At step (11), the file access ( ) is output from the local file system 502 and received by the delegate NFS server 504. At step (12), the delegate NFS server 504 issues a request to the user registry 506 to normalize a user identity associated with the local user. At step (13), the response from the user registry is received and processed by the delegated NFS server 504. During this step, and as noted above, the delegate NFS server 504 associates (to the original NFS request) "context" information associated with the local user 500. Thus, the file access is made under a context of the configured local user. At step (14), the NFS file access ( ) which is now augmented to include (or, more generally, have associated therewith) information defining a context of the local user 500, is then sent to the web application 508. At step (15), and as noted above, the web application performs authentication (using its configured security model) as well as authorization (in the latter case, using its local authorization rules). If the request is validated through the authentication and authorization, a response is returned to the delegated NFS server at step (16). This response is forwarded on to the local file system at step (17) and, thereafter at step (18), to the NFS client associated with the local user. This completes the processing of the file access request.

Steps (1)-(9) are shown with steps (10)-(18) on the same diagram for convenience only, but these operations need not occur together or in this sequence. Although not meant to be limiting, typically the mount (context) is implemented as an HTTP request (with the response being an HTTP response). For example, the mount on the client may be translated to an HTTP GET request to retrieve a list of files/permission (e.g., structured as XML, JSON, text, or some other format).

In a preferred embodiment, the NFS requests (e.g., but without limitation, mount and file access) are made under the context of the configured user. Authentication is carried out by using whatever web application authentication mechanism is supported by the application's then-current security model. Authorization is carried out against whatever authorization rules and their constraints are then-currently enforced by the web application with respect to the context for the configured user. These authorization rules may provide permissions based on individual user, user group, role, or the like. The result is a robust and reliable technique for enabling NFS-based access to secure web resources without having to modify the application's authentication mechanism, and at the same time ensuring that the application's authorization rules are enforced.

Preferably, authorization rules are managed by the web application. In an embodiment as described, the NFS server accesses the web application as a particular user. The web application then determines how to respond to that particular user. For example, a user may only be able to view or download certain files. This restriction, however, is generally transparent to the delegate NFS server. The NFS server receives responses from the web application, but it need not understand that one or more authorization rules may have been applied to its request.

As one of ordinary skill will appreciate, the techniques herein are facilitated by running by the NFS client and NFS server components within the local client system. A by-product of this approach is that neither the web application nor any of its associated authentication and authorization mechanisms need to be changed or modified.

The particular manner in which the authorization rules are enforced at the web application is not a limitation of the disclosed subject matter. These rules may be enforced by the authorization mechanism in association with the authentication process, or as a separate and distinct operation (from authentication).

Preferably, the described technique is implemented by providing an NFS service that has been modified (to include the delegate NFS server) to interact with a remote web application in the manner described. As noted above, the scheme does not require any changes to the web application (or, more generally, the web portal).

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The techniques herein are not limited to use with a web portal. The above-described technique also may be implemented to enable user impersonation (by the delegated NFS server) to other services.

More generally, computing devices within the context of the disclosed subject mater are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As already noted, the scheme described herein may be implemented in or in conjunction with various server-side architectures other than web portals. These include, without limitation, simple n-tier architectures, cloud-based architectures, federated systems, and the like.

Still more generally, the subject matter described herein can take the form of an entirely hardware embodiment, an entirely software embodiment or an embodiment containing both hardware and software elements. The delegated NFS server and the described function are implemented in software, which includes but is not limited to firmware, resident software, microcode, and the like. The "token" may be any generic data string or structure that can be transported over a link and/or stored in a data store, such as computer memory.

Furthermore, the delegation functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the delegated NFS component is implemented in a special purpose computer, preferably in software executed by one or more processors. The software also is maintained in one or more data stores or memories associated with the one or more processors, and the software may be implemented as one or more computer programs.

The delegation function may be implemented as an adjunct or extension to an existing security (authentication) service, or access manager solution. The technique also may be implemented in an automated manner, as has been described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application. Further, while typically the client-server interactions occur using HTTP, this is not a limitation either. The client server interaction may be formatted to conform to the Simple Object Access Protocol (SOAP) and travel over HTTP (over the public Internet), FTP, REST, or any other reliable transport mechanism (such as IBM®MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The techniques disclosed herein are not limited to a web-based portal such as described and illustrated above and, in particular, having a point of contact that provides authentication, session management and authorization. As noted, the above-described NFS protocol mapping function may be used in any system, device, portal, site, or the like wherein web-based (HTTP-based) resource access is required.

Having described our invention, what we now claim is as follows.

The invention claimed is:

1. A method, operable within a client system, of enabling access to a resource associated with a web application that is remote from the client system, comprising:
   instantiating a Network File System (NFS) server in the client system, the NFS server executing in a hardware element;
   exchanging authentication information between the NFS server in the client system and the web application using an authentication mechanism associated with the web application to authenticate the NFS server to the web application;
   following authentication of the NFS server, providing the NFS server a token that represents that one or more users of the client system are authenticated to access resources associated with the web application;
   responsive to an NFS request received at the NFS server in the client system from a particular user that is one of the users of the client system represented by the token, issuing to the web application a modified request that has associated therewith a permission specific to the particular user; and
   receiving at the NFS server a response to the modified request, wherein the response is authorized only for the particular user.

2. The method as described in claim 1 wherein the modified request is associated with a context for a user associated with the NFS request received at the NFS server.

3. The method as described in claim 2 wherein the NFS request is one of: a mount, and a file access.

4. The method as described in claim 1 wherein the authentication information exchanged between the NFS server and the web application includes a user credential.

5. The method as described in claim 4 wherein the authentication mechanism associated with the web application is OAuth and the authentication information is exchanged using HTTP.

6. The method as described in claim 1 wherein the response is a function of an authorization rule applied at the web application.

7. Apparatus associated with a client system, comprising:
   a processor;
   computer memory holding computer program instructions that when executed by the processor perform a method of enabling access to a resource associated with a web application that is remote from the client system, the method comprising:
      instantiating in the client system a Network File System (NFS) server;
      exchanging authentication information between the NFS server in the client system and the web application using an authentication mechanism associated with the web application to authenticate the NFS server to the web application;
      following authentication of the NFS server, providing the NFS server a token that represents that one or more users of the client system are authenticated to access resources associated with the web application;
      responsive to an NFS request received at the NFS server in the client system from a particular user that is one of the users of the client system represented by the token, issuing to the web application a modified request that has associated therewith a permission specific to the particular user; and
      receiving at the NFS server a response to the modified request, wherein the response is authorized only for the particular user.

8. The apparatus as described in claim 7 wherein the modified request is associated with a context for a user associated with the NFS request received at the NFS server.

9. The apparatus as described in claim 8 wherein the NFS request is one of: a mount, and a file access.

10. The apparatus as described in claim 7 wherein the authentication information exchanged between the NFS server and the web application includes a user credential.

11. The apparatus as described in claim 10 wherein the authentication mechanism associated with the web application is OAuth and the authentication information is exchanged using HTTP.

12. The apparatus as described in claim 7 wherein the response is a function of an authorization rule applied at the web application.

13. A computer program product in a non-transitory computer readable medium for use in a client system, the computer program product holding computer program instructions which, when executed by the client system, perform a method of enabling access to a resource associated with a web application that is remote from the client system, the method comprising:
   instantiating in the client system a Network File System (NFS) server;
   exchanging authentication information between the NFS server in the client system and the web application using an authentication mechanism associated with the web application to authenticate the NFS server to the web application;
   following authentication of the NFS server, providing the NFS server a token that represents that one or more users of the client system are authenticated to access resources associated with the web application;
   responsive to an NFS request received at the NFS server in the client system from a particular user that is one of the users of the client system represented by the token, issuing to the web application a modified request that has associated therewith a permission specific to the particular user; and receiving at the NFS server a response to the modified request, wherein the response is authorized only for the particular user.

14. The computer program product as described in claim 13 wherein the modified request is associated with a context for a user associated with the NFS request received at the NFS server.

15. The computer program product as described in claim 14 wherein the NFS request is one of: a mount, and a file access.

16. The computer program product as described in claim 13 wherein the authentication information exchanged between the NFS server and the web application includes a user credential.

17. The computer program product as described in claim 16 wherein the authentication mechanism associated with the web application is OAuth and the authentication information is exchanged using HTTP.

18. The computer program product as described in claim 13 wherein the response is a function of an authorization rule applied at the web application.

19. The method as described in claim 1 wherein the NFS server is authenticated to the web application as a super user that acts on behalf of the one or more users of the client system as represented by the token.

20. The apparatus as described in claim 7 wherein the NFS server is authenticated to the web application as a super user that acts on behalf of the one or more users of the client system as represented by the token.

21. The computer program product as described in claim 13 wherein the NFS server is authenticated to the web application as a super user that acts on behalf of the one or more users of the client system as represented by the token.

\* \* \* \* \*